United States Patent [19]
Thomas

[11] Patent Number: 5,292,474
[45] Date of Patent: * Mar. 8, 1994

[54] METHOD OF MAKING A PREFORMED FABRIC LINER WHICH LINES A TOOTHED BELT CONSTRUCTION

[75] Inventor: Danny L. Thomas, Forsyth, Mo.

[73] Assignee: Dayco Products, Inc., Dayton, Ohio

[*] Notice: The portion of the term of this patent subsequent to Jan. 5, 2010 has been disclaimed.

[21] Appl. No.: 932,864

[22] Filed: Aug. 20, 1992

Related U.S. Application Data

[60] Division of Ser. No. 705,876, May 28, 1991, Pat. No. 5,176,867, which is a continuation of Ser. No. 388,541, Aug. 2, 1989, abandoned.

[51] Int. Cl.$^5$ .............................................. B29C 33/40
[52] U.S. Cl. .................................... 264/224; 156/140; 264/227; 264/313
[58] Field of Search ................ 156/138, 140, 141; 264/138, 157, 159, 221, 224, 225, 226, 227, 313, 314, 257, 258

[56] References Cited

U.S. PATENT DOCUMENTS

| | | | |
|---|---|---|---|
| 3,473,989 | 10/1969 | Richmond | 264/227 |
| 3,839,116 | 10/1974 | Thomas et al. | 156/138 |
| 4,066,732 | 1/1978 | Redmond, Jr. | 156/138 |
| 4,106,966 | 8/1978 | Brooks | 156/140 |
| 4,266,937 | 5/1981 | Takano | 156/138 |
| 4,311,474 | 1/1982 | Standley | 156/137 |
| 4,443,396 | 4/1984 | Breher | 264/257 |
| 4,486,375 | 12/1984 | Hirai | 156/140 |
| 4,813,919 | 3/1989 | Nosaka et al. | 474/266 |
| 5,176,867 | 1/1993 | Thomas | 264/224 |

Primary Examiner—Jay H. Woo
Assistant Examiner—Robert B. Davis
Attorney, Agent, or Firm—Joseph V. Tassone

[57] ABSTRACT

A toothed belt construction, preformed fabric liner therefor and methods of making the same are provided, the preformed fabric liner being adapted to line the toothed surface of a toothed belt construction and having serially disposed tooth-shaped projections throughout the length thereof that substantially accurately correspond to the teeth of the belt construction so as to line the toothed surface thereof, the preformed fabric liner comprising an endless tubular sleeve.

3 Claims, 7 Drawing Sheets

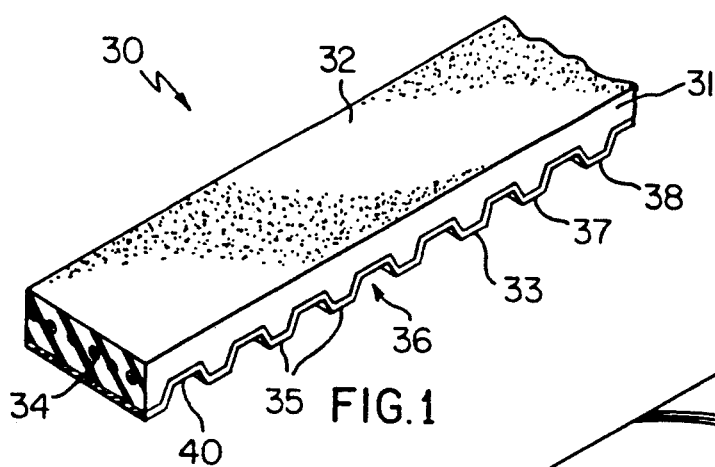
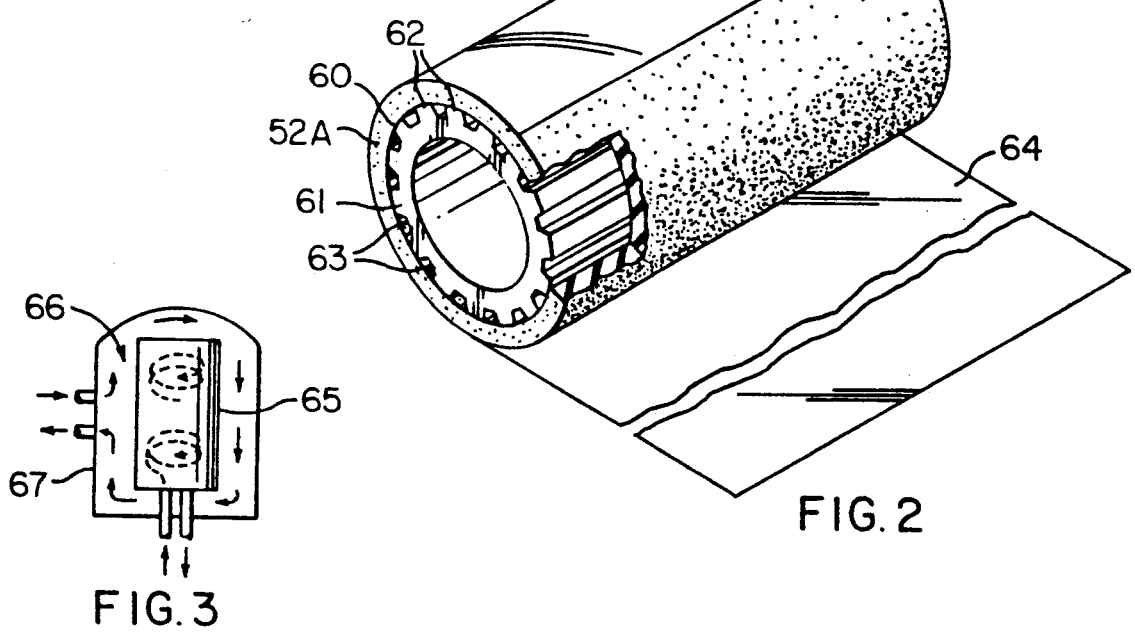
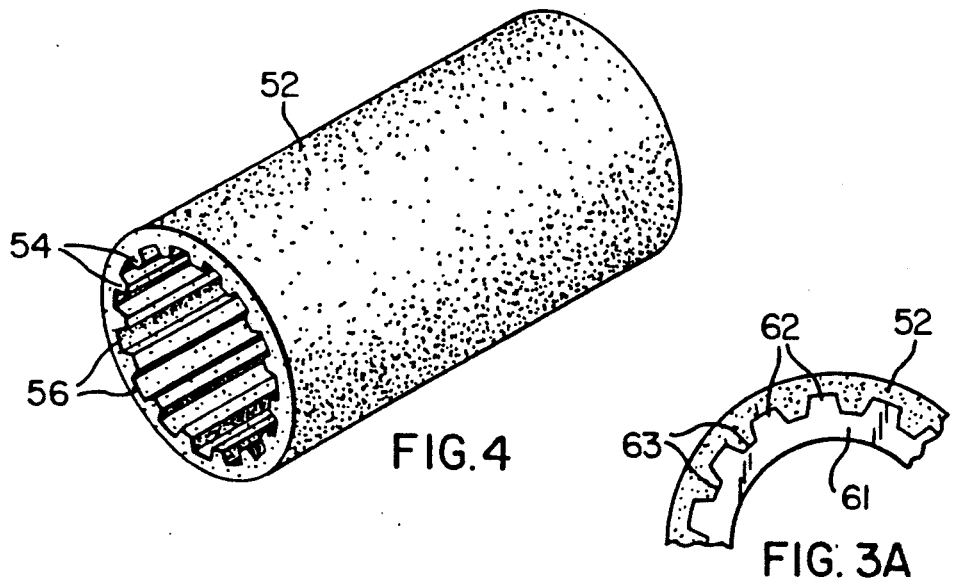

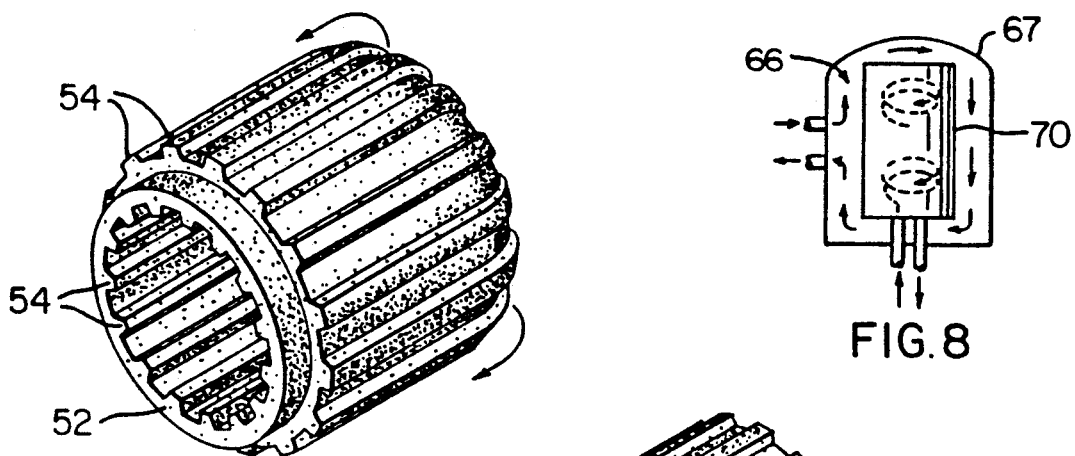
FIG. 5
FIG. 8
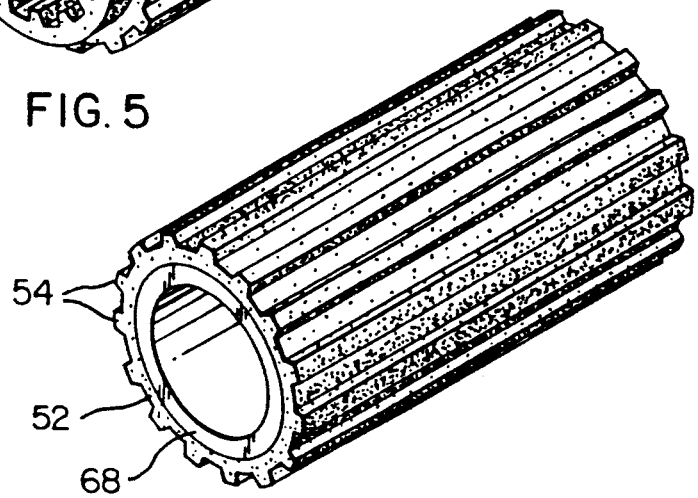
FIG. 6
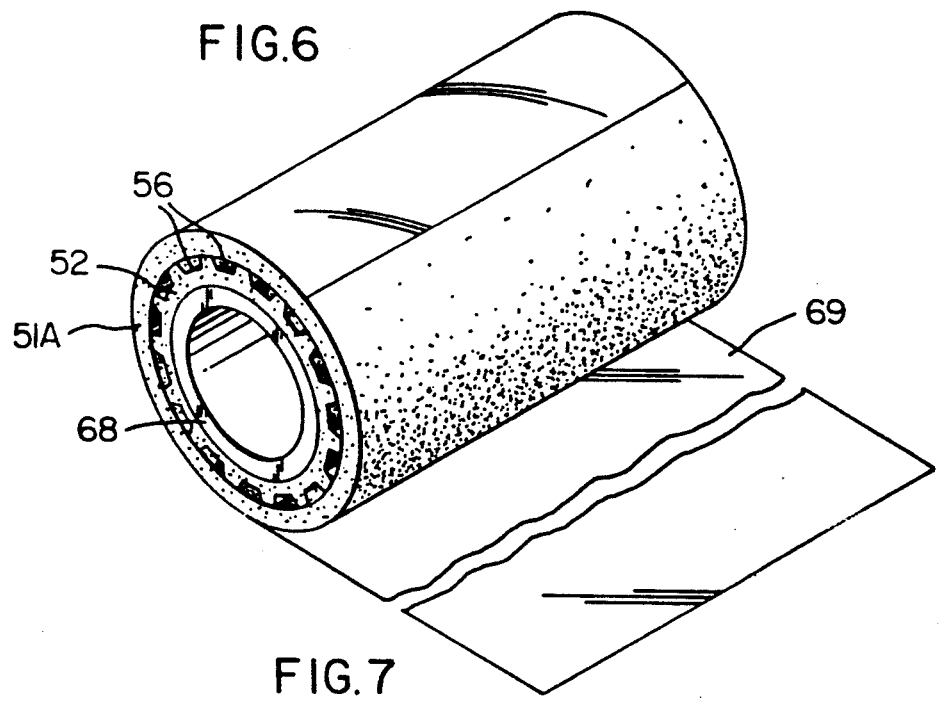
FIG. 7

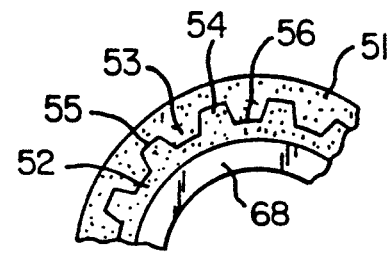
FIG. 8A
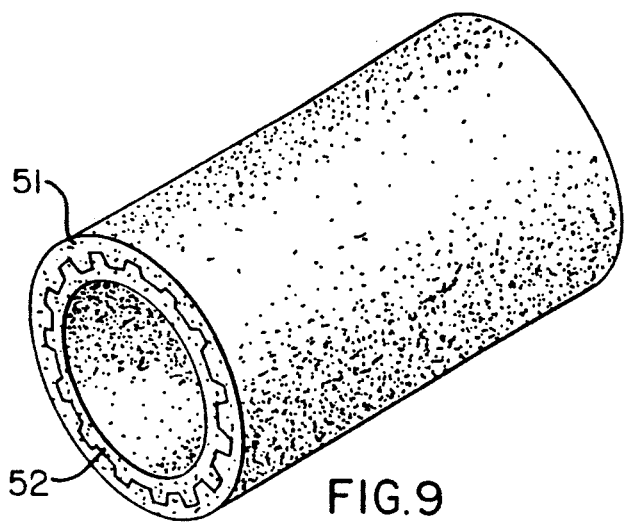
FIG. 9
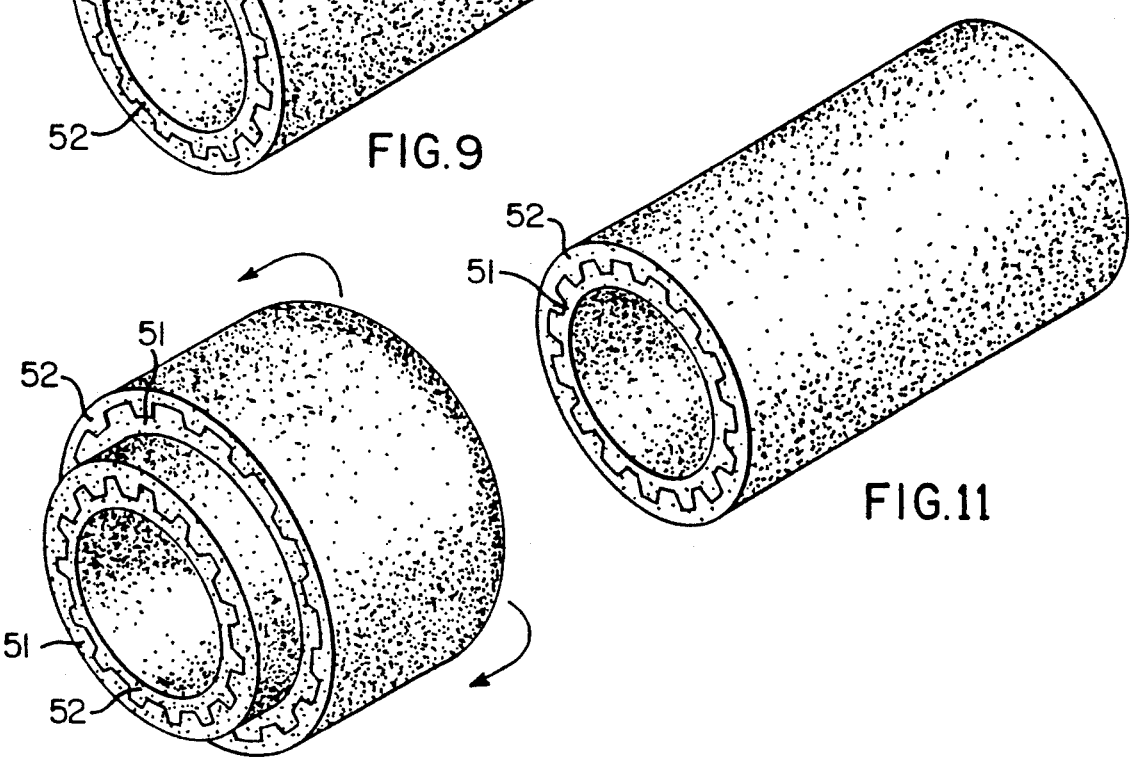
FIG. 11
FIG. 10
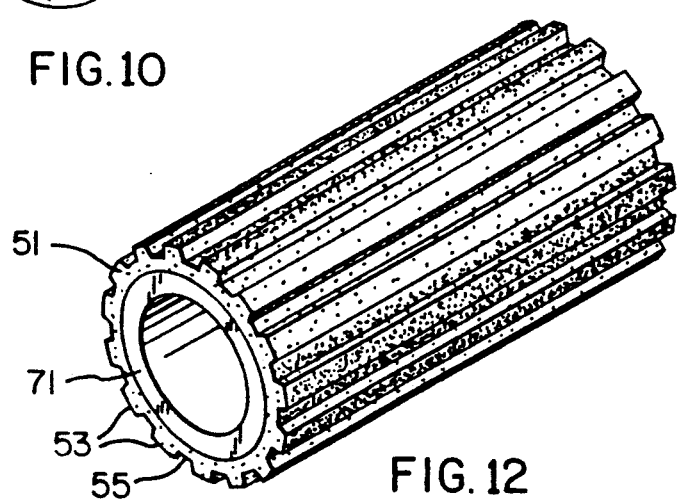
FIG. 12

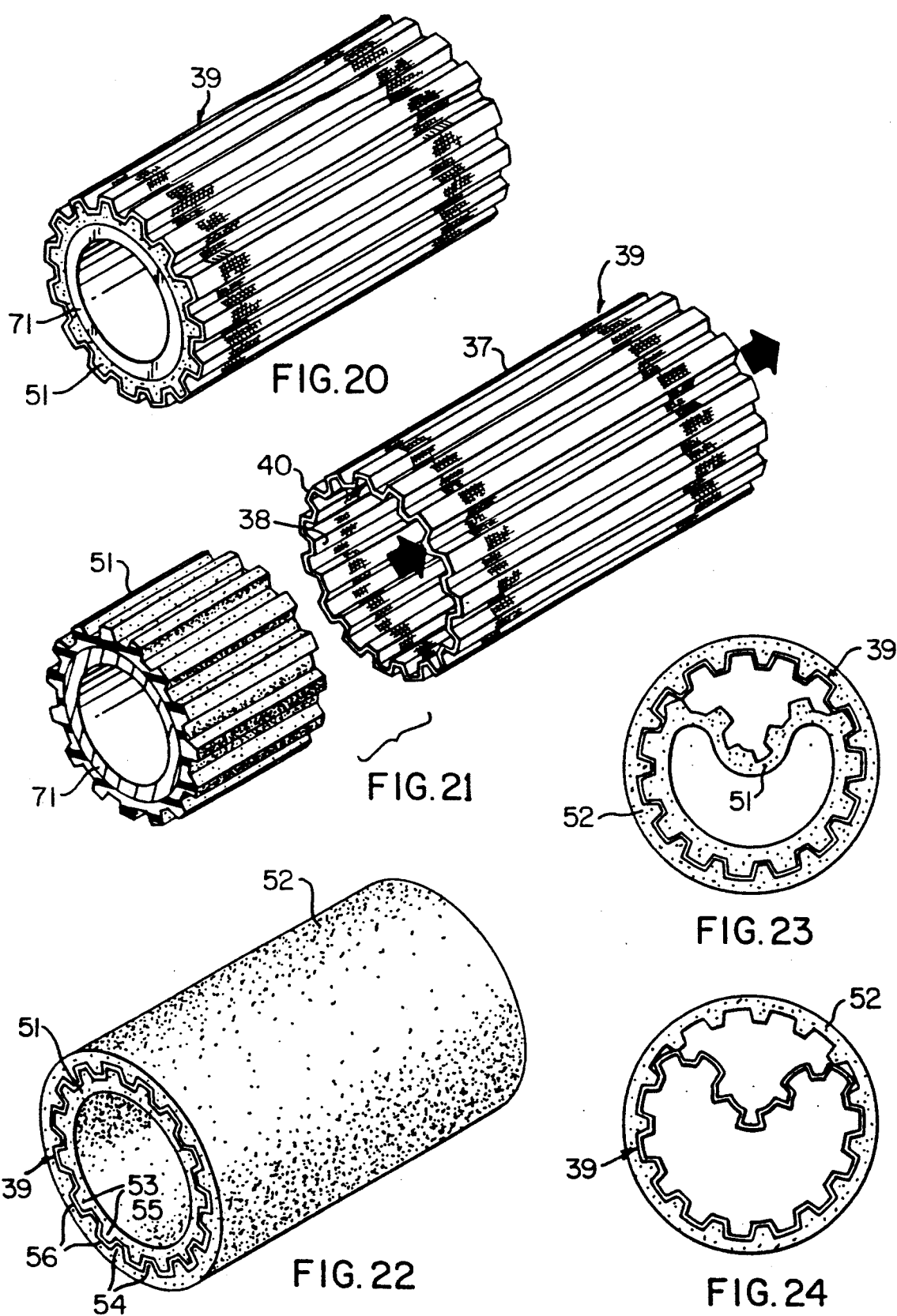

METHOD OF MAKING A PREFORMED FABRIC LINER WHICH LINES A TOOTHED BELT CONSTRUCTION

CROSS REFERENCE TO RELATED APPLICATIONS

This application is a divisional patent application of its copending parent patent application, Ser. No. 705,876, filed May 28, 1991, now U.S. Pat. No. 5,176,867, which, in turn, is a continuation patent application of its copending parent patent application, Ser. No. 388,541, filed Aug. 2, 1989, now abandoned.

BACKGROUND OF THE INVENTION

1. Field of the Invention

This invention relates to a new toothed belt construction and to a new preformed fabric means for lining the toothed surface means of a toothed belt construction as well as to new methods of making the same.

2. Prior Art Statement

It is known to provide a preformed fabric means for lining the toothed surface means of a toothed belt construction, the preformed fabric means having serially disposed tooth-shaped projections substantially throughout the length thereof that substantially accurately correspond to the teeth of the belt construction so as to line the toothed surface means thereof. For example, see the U.S. patent to Hirai, U.S. Pat. No. 4,486,375.

SUMMARY OF THE INVENTION

It is one feature of this invention to provide a new preformed fabric means for lining the toothed surface means of a toothed belt construction wherein the preformed fabric means can be placed with the least amount of time and expense exactly where it is desired in every land and groove of a mold device that is utilized to form the toothed belt construction therewith.

In particular, it has been found according to the teachings of this invention that such a preformed fabric means can be uniquely formed as an endless tubular sleeve for the above purpose.

For example, one embodiment of this invention provides a preformed fabric means for lining the toothed surface means of a toothed belt construction, the preformed fabric means having serially disposed tooth-shaped projections throughout the length thereof that substantially accurately correspond to the teeth of the belt construction so as to line the toothed surface means thereof, the preformed fabric means comprising an endless tubular sleeve.

Accordingly, it is an object of this invention to provide a new preformed fabric means for lining the toothed surface means of a toothed belt construction, the preformed fabric means of this invention having one or more of the novel features of this invention as set forth above or hereinafter shown or described.

Another object of this invention is to provide a new method of making such a preformed fabric means, the method of this invention having one or more of the novel features of this invention as set forth above or hereinafter shown or described.

Another object of this invention provides a new toothed belt construction having such a preformed fabric means lining the toothed surface means thereof, the toothed belt construction of this invention having one or more of the novel features of this invention as set forth above or hereinafter shown or described.

Another object of this invention is to provide a new method of making such a toothed belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view that is partially in cross section and illustrating the new toothed belt construction of this invention.

FIG. 2 is a reduced perspective view illustrating one of the steps for making a cylindrical mold member of this invention for making the preformed fabric liner means of this invention that is illustrated in FIG. 21.

FIG. 3 is a reduced schematic view illustrating an apparatus for subjecting the structure of FIG. 2 to heat and pressure to deform a polymeric sleeve of FIG. 2 into the mold device of FIG. 2.

FIG. 3A is a fragmentary end view of the polymeric sleeve after the same has been deformed into the mold device of FIG. 2 by the apparatus and method of FIG. 3.

FIG. 4 is a perspective view of the formed cylindrical mold member that has been made by the method of FIGS. 2 and 3 and after the same has been removed from its mold device.

FIG. 5 is a perspective view that illustrates how the cylindrical mold member of FIG. 4 is inverted or turned inside out.

FIG. 6 is a perspective view that illustrates the inverted cylindrical mold member of FIG. 5 disposed on a cylindrical backup member of rigid material.

FIG. 7 is a view similar to FIG. 6 and illustrates another sleeve of polymeric material disposed around the structure of FIG. 6 and being wrapped with a heat shrinkable film.

FIG. 8 is a view similar to FIG. 3 and illustrates the apparatus for applying heat and pressure to the structure of FIG. 7 to cause the second sleeve of polymeric material to deform into the inverted cylindrical mold member of FIG. 6.

FIG. 8A is a fragmentary end view of the structure of FIG. 7 after the same has been subjected to the heat and pressure of the apparatus of FIG. 8 that deforms the second sleeve of polymeric material against the inverted cylindrical mold member of FIG. 6.

FIG. 9 is a perspective view of the structure of FIG. 8A after the cylindrical backup device has been removed.

FIG. 10 is a perspective view and illustrates how the structure of FIG. 9 is inverted or turned inside out.

FIG. 11 is a perspective view and illustrates the structure of FIG. 9 after the same has been inverted in the manner of FIG. 10.

FIG. 12 is a perspective view and illustrates how the inner cylindrical mold member of FIG. 11 is disposed on a cylindrical backup member.

FIG. 20 is a perspective view and illustrates the structure of FIG. 19 after the outer cylindrical mold member has been removed.

FIG. 21 is an exploded perspective view illustrating how the preformed fabric lining means of this invention is removed from the inner cylindrical mold member of FIG. 20.

FIG. 22 is a view similar to FIG. 19 and illustrates the structure after the inner cylindrical backup member has been removed.

FIG. 23 is an end view of the structure of FIG. 22 and illustrates how the inner cylindrical mold member can be inwardly folded so as to be subsequently removed from the remaining structure of FIG. 22.

FIG. 24 is a view similar to FIG. 23 after the inner mold member has been removed and illustrates how the preformed fabric means of this invention can be inwardly folded so as to be subsequently removed from the outer cylindrical mold device.

DESCRIPTION OF THE PREFERRED EMBODIMENTS

Figure 13:
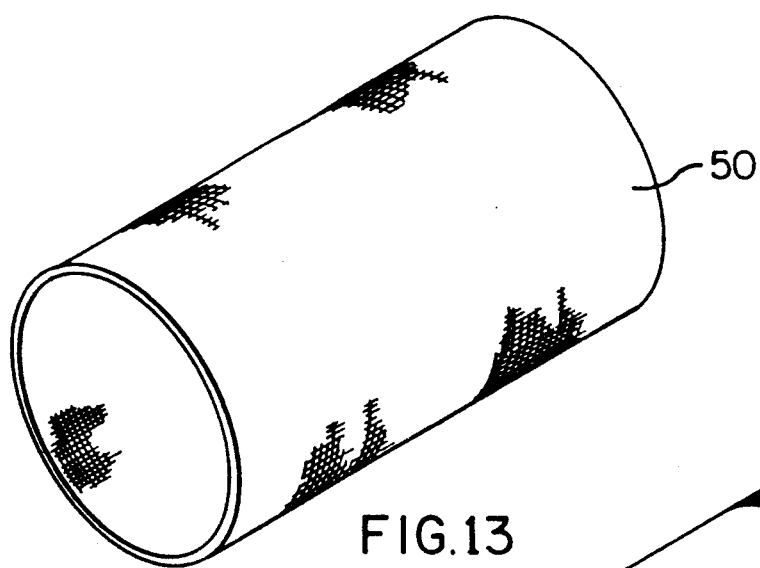
FIG. 13 is a perspective view and illustrates a fabric lining means that is formed as an endless tubular sleeve.

While the various features of this invention are hereinafter illustrated and described as being particularly adapted to provide a toothed belt construction having a particular toothed configuration, it is to be understood that the various features of this invention can be utilized singly or in various combinations thereof to provide a toothed belt construction with teeth having different configurations as desired.

Therefore, this invention is not to be limited to only the embodiments illustrated in the drawings because the drawings are merely utilized to illustrate one of the wide variety of uses of this invention.

Referring now to FIG. 1, the new toothed belt construction of this invention is generally indicated by the reference numeral 30 and comprises a body member 31 formed mainly of polymeric material and having opposed outer and inner surface means 32 and 33 and an intermediate tensile means 34, the inner surface means 33 having a plurality of transversely disposed and alternating teeth 35 and grooves 36 and being lined with a fabric means 37 that forms part of the belt construction 30 and substantially accurately conforms to the contour of the teeth 35 and grooves 36 for a purpose and in a manner well known in the art. For example, see the aforementioned U.S. patent to Hirai, U.S. Pat. No. 4,486,375, whereby this patent is being incorporated into this disclosure by this reference thereto.

It is also well known from the U.S. patent to Hirai, U.S. Pat. No. 4,486,375, that it is desired to preform the fabric means 37 with a plurality of tooth-like projections 38 that correspond to the teeth 35 of the belt body 32 so that the preformed fabric means 37 can be readily utilized in a mold apparatus that is utilized to form the belt construction 30.

However, as previously set forth, it is a feature of this invention to uniquely form such preformed fabric means 37 so as to comprise an endless tubular sleeve which readily can be utilized with such mold apparatus with the least amount of time and expense.

For example, reference is now made to FIG. 21 wherein it can be seen that the preformed liner means 37 of this invention is formed as an endless tubular sleeve that is generally indicated by the reference numeral 39 in FIG. 21 and has the tooth-like projections 38 preformed therein and being alternately separated by land portions or grooves 40 that correspond to the land portions or grooves 36 of the belt body 32 as will be apparent hereinafter.

The mold apparatus for forming the belt constructions 30 of this invention is generally indicated by the reference numeral 41 in FIG. 26 and is utilized to form a tubular belt sleeve that is generally indicated by the reference numeral 42 in FIG. 27, the belt sleeve 42 to be subsequently cut into the individual endless belt constructions 30 in a manner well known in the art. For example, see FIG. 12 and the description thereof that is set forth in the U.S. patent to Thomas et al, U.S. Pat. No. 3,839,116, whereby this U.S. patent is being incorporated into this disclosure by this reference thereto.

Figure 26:
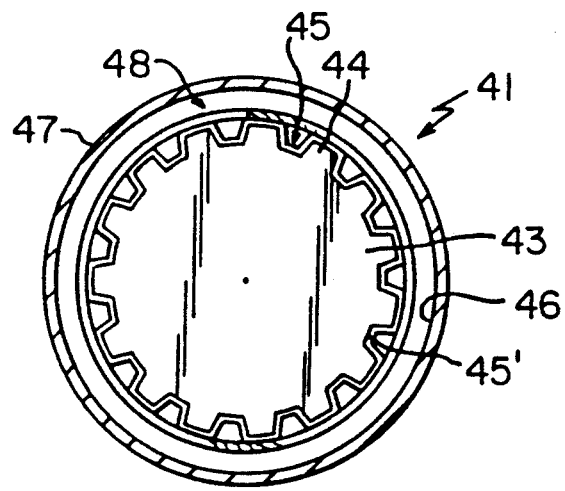
FIG. 26 illustrates the structure of FIG. 25 disposed within an outer mold member and before the belt forming material is disposed therein.
Figure 27:
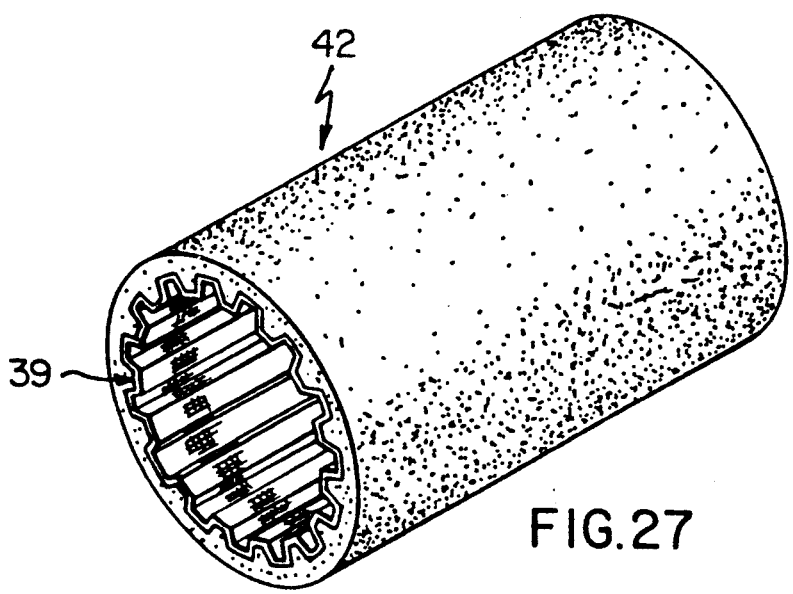
FIG. 27 is a perspective view and illustrates the belt sleeve subsequently formed from the structure of FIG. 26 and before the toothed belt constructions of this invention are cut therefrom in a conventional manner.

The mold apparatus 41 of FIG. 26 is substantially the same as the mold apparatus in the aforementioned U.S. patent to Hirai, U.S. Pat. No. 4,486,375, and comprises an inner mold member 43 formed of rigid material, such as metallic material, and having a plurality of tooth-like projections 44 and tooth-like grooves 45 extending in an alternating manner about the outer periphery 45' thereof that is disposed in spaced relation from a substantially smooth internal peripheral surface 46 of an outer cylindrical mold member 47 that is formed of rigid material, such as metallic material, and that cooperates with the inner mold member 43 to define a chamber 48 therebetween for receiving the polymeric material that forms the belt body 32 while such material is in a liquid form thereof and before the same has been set, cured or chemically reacted as is well known in the art.

Figure 25:
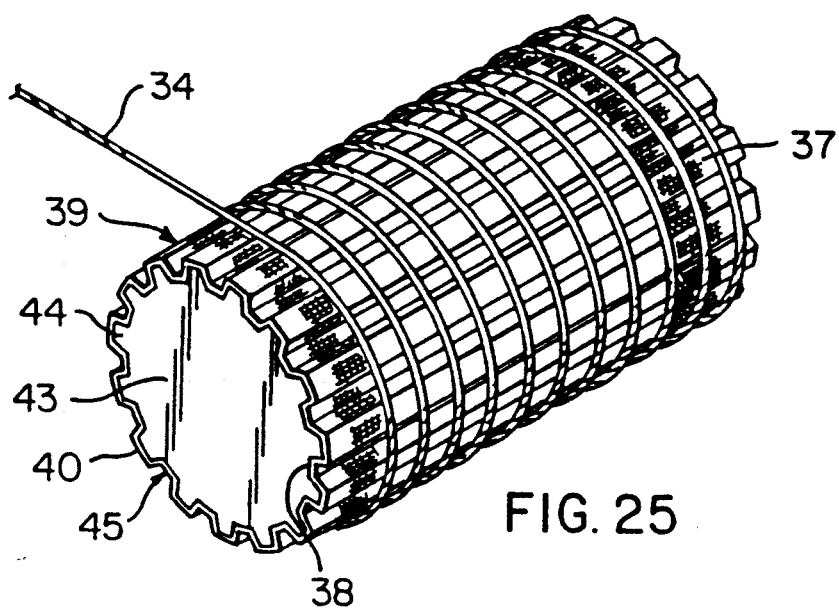
FIG. 25 is a perspective view illustrating how the preformed fabric lining means of this invention of FIG. 21 or of FIG. 24 is initially disposed on an inner toothed mold member and having a tensile cored member helically wound thereon.

As illustrated in FIG. 25, the tubular sleeve 39 that forms the preformed fabric liner means 37 of this invention is adapted to be readily telescoped onto the inner mold member 43 as the preformed tooth-like projections 38 thereof are adapted to be readily received in a sliding and accurate manner in the tooth-like grooves 45 of the mold member 43 while the tooth-like grooves 40 of the sleeve 39 are adapted to accurately line the tooth-like projections 44 of the mold member 43 as illustrated in FIG. 25 as the sleeve 39 is slipped over the mold member 43.

Thereafter, the tensile cord member 34 is helically wound onto the assembly of the sleeve 39 and mold member 43 in the manner illustrated in FIG. 25 with such structure subsequently being disposed in the outer mold member 47 to define the chamber 48 therewith. Thereafter, the body building polymeric material is exuded into the chamber 48 to fill the same and the resulting structure is then set, cured, or chemically reacted in a manner well known in the art to produce the belt sleeve after the mold member 43 and the belt sleeve 42 have been removed from the outer mold member 47 and the inner mold member 43 has been removed from the sleeve 42 as illustrated in FIG. 27. Thus, it can be seen that the belt sleeve 42 has the preformed liner means 39 chemically bonded thereto and forming the inner peripheral surface means thereof in an accurate manner.

In this manner, when the belt sleeve 42 is subsequently cut into the individual endless belt constructions 30 as illustrated in FIG. 1, the fabric means 37 is accurately lining the teeth 35 thereof for the reasons previously set forth.

The method and apparatus of this invention for forming the preformed tubular sleeve 39 of this invention will now be described.

Figure 14:
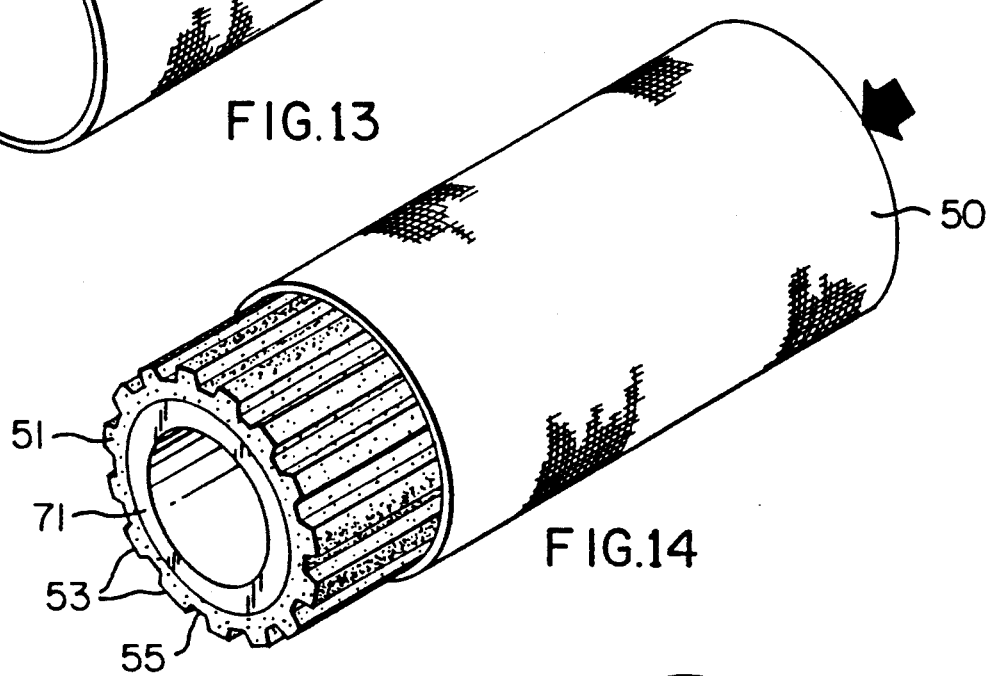
FIG. 14 is a perspective view and illustrates how the tubular sleeve of FIG. 13 is telescoped onto the mold structure of FIG. 12.
Figure 15:
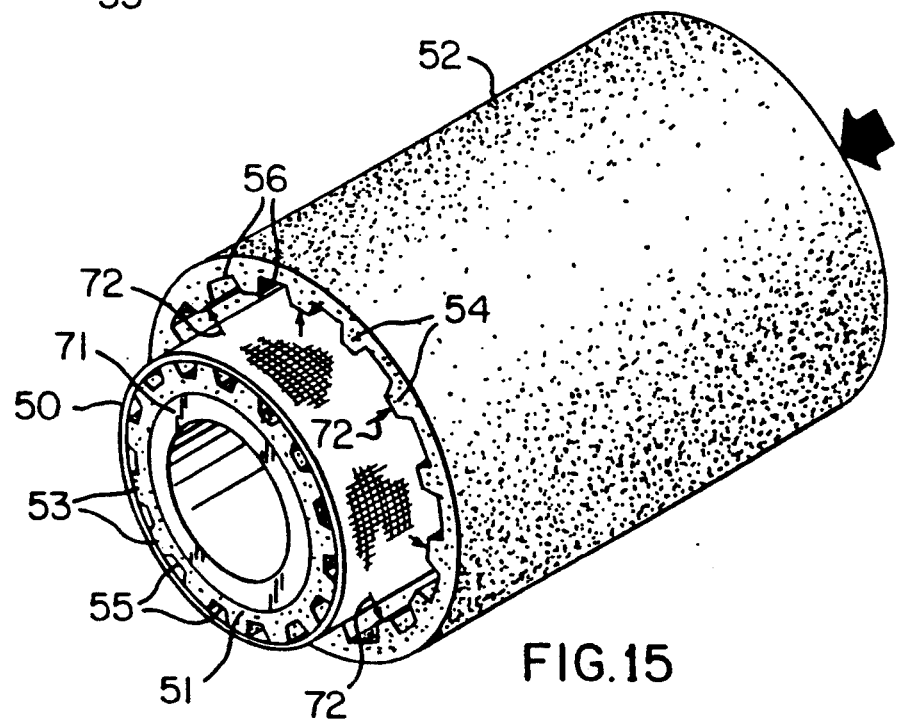
FIG. 15 is a view similar to FIG. 14 and illustrates how the outer cylindrical mold member of FIG. 11 is outwardly stretched and then telescoped onto the structure of FIG. 14.
Figure 19:
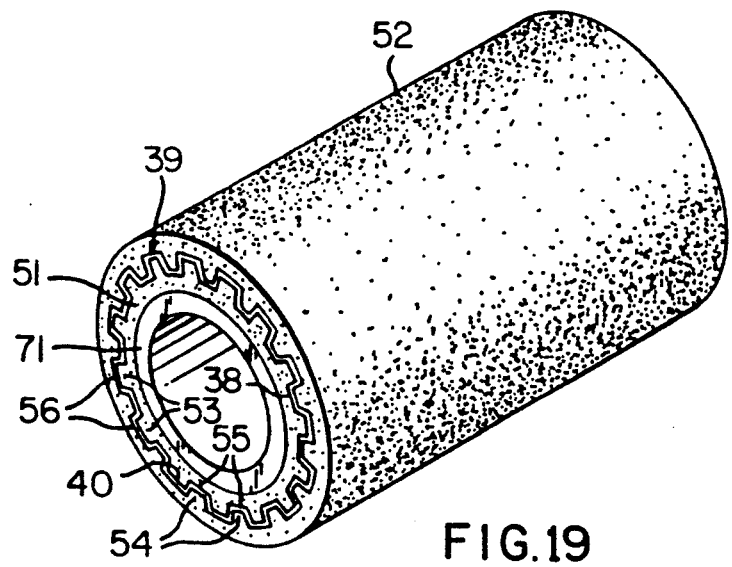
FIG. 19 is a perspective view and illustrates the structure of FIG. 16 after the same has been removed from the apparatus of FIG. 18.

Referring now to FIGS. 13-15, a tubular sleeve 50 of any suitable stretch fabric, such as a pretreated and presewn or otherwise formed cylinder of nylon stretch fabric that is adapted to be heat set by having the temperature thereof allowed to rise to the setting temperature of the treatment thereof in a manner well known in the art, is adapted to be telescopically disposed between an inner cylindrical mold member 51 and an outer cylindrical mold member 52 of this invention which respectively have alternating tooth-like projections 53 and 54 and tooth-like grooves 55 and 56 respectively disposed on the outer and inner peripheries thereof and are adapted to substantially index together in the manner illustrated in FIG. 19 or FIG. 22 to preform the sleeve 50 into the toothed tubular sleeve 39 of this invention with the tooth-like projections 38 and tooth-like grooves 40 being accurately formed therein for intimately lining the desired mold member 43 of the apparatus 41 as previously set forth.

According to the teachings of this invention, the outer cylindrical mold member 52 is formed before the mold member 51 by first disposing a sleeve 52A of uncured polymeric material of the desired thickness around the outer periphery 60 of a cylindrical mold device 61 that has alternating tooth-like projections 62 and tooth-like grooves 63 accurately formed therein and being of the size that corresponds to the desired configurations of the lined teeth 35 and lined grooves 36 of the particular belt construction 30 that is to be subsequently formed, the cylindrical mold member 61 being formed of any suitable rigid material, such as metallic material and may actually be the previously described mold member 43. The sleeve 52A of polymeric material initially being a slab of material that has its opposed ends abutted or lapped on the mold member 60 in a manner well known in the art. For example, see FIG. 3 of the U.S. patent to Wetzel et al, U.S. Pat. No. 4,414,047, whereby this patent is being incorporated into this disclosure by this reference thereto.

After the sleeve of polymeric material 52A is telescoped or otherwise disposed onto the mold member 60, the same is cross-wrapped with a shrink tape or sheet film 64 as illustrated in FIG. 2, such as nylon, polyester, etc., with the resulting structure 65 then being placed in a chamber 66 or an apparatus 67 that is adapted to apply heat and steam pressure to the structure 65 to assist the shrink film 64 to shrink and thereby exude the polymeric material 52A into the grooves 63 of the mold member 61 to completely fill the same in the manner illustrated in FIG. 3A and in a manner well known in the art. For example, such apparatus 67 is illustrated in FIG. 7 of the aforementioned U.S. patent to Thomas et al, U.S. Pat. No. 3,839,116, and therefore need not be further described.

The apparatus 67 also heat cures the polymeric material of the sleeve 52A after the same has formed the cylindrical toothed mold member 52 of this invention as illustrated in FIG. 3A so that when the structure 65 is subsequently removed from the apparatus 67 and cooled, the shrink film 64 and the inner mold member 61 can be removed therefrom whereby the resulting tubular mold member 52 has the teeth 54 thereof forming the inner peripheral surface thereof as illustrated in FIG. 4.

While the polymeric material that forms the sleeve 52A previously described can be of any suitable polymeric material, such as rubber, one working embodiment thereof comprises hypalon that is vulcanized by the apparatus 67 in the manner previously described to form the cylindrical mold member 52 as previously described.

Thereafter, the mold member 52 of FIG. 4 is inverted or turned inside out in the manner illustrated in FIG. 5 so as to have the tooth-like projections 54 thereof now disposed on the outer periphery thereof as illustrated in FIG. 6, such inversion of the tubular member 52 of FIG. 4 in the manner illustrated in FIG. 5 being a process that is well known in the art wherein a flexible tubular member is turned inside out as illustrated in FIG. 5.

The inverted tubular mold member 52 of FIG. 6 is now utilized to form the tubular member 51.

In particular, a rigid tubular backing member 68 of metallic material is inserted in the inverted tubular member 52 in the manner illustrated in FIG. 6 and a sleeve means 51A of any suitable polymeric material such as the aforementioned rubber material known as hypalon, of the desired thickness is disposed about the mold member 52 in a telescoping relation therewith in a manner similar to the slab 52A as previously described and is subsequently cross-wrapped with a nylon shrink film 69, similar to film 64, to produce the resulting structure 70 that is disposed in the chamber 66 of the apparatus 67 as illustrated in FIG. 8 to be heat cured under pressure whereby the nylon shrink film 69 shrinks and forces the heated material 51A to exude into the grooves 56 of the cylindrical mold member 52 to form the teeth 53 of the resulting mold member 52 in the manner illustrated in FIG. 8A.

Thus, it can be seen that the teeth 53 and grooves 55 of the resulting cylindrical mold member 51 are accurately formed respectively by the grooves 56 and teeth 54 of the previously vulcanized cylindrical mold member 52.

The apparatus 67 also heat cures such exuded mold member 51 in its molded relation with the mold member 52.

Subsequently, the structure 70 is removed from the apparatus 67 and cooled so that the film 69 can be removed. The rigid backing member 68 is then removed from the mold member 52 and while the mold members 51 and 52 are in the telescoped condition as illustrated in FIG. 9, the same are inverted or turned inside out in the manner illustrated in FIG. 10 so that the mold member 52 now forms the outer mold member thereof and the mold member 51 forms the inner mold member thereof as illustrated in FIG. 11.

Thereafter, the inverted mold members 51 and 52 of FIG. 11 are separated from each other and the inner mold member 51 has a rigid tubular backing member 71 of metallic material inserted therein as illustrated in FIG. 12.

Figure 16:
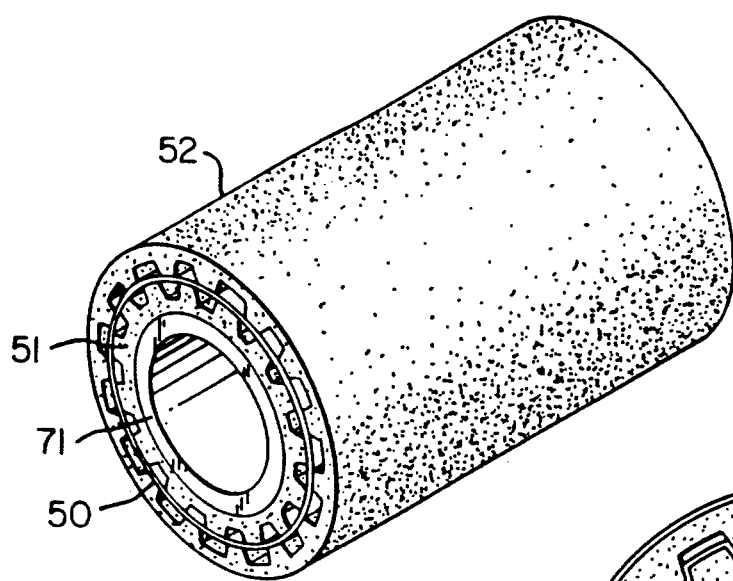
FIG. 16 is a view similar to FIG. 15 and illustrates the structure of FIG. 15 after the outer cylindrical mold member has been disposed in place.

The sleeve 50 of stretchable fabric is then telescoped over the structure of FIG. 12 in the manner illustrated in FIG. 14 and the outer mold member 52 is outwardly expanded or stretched as represented by the arrows 72 of FIG. 15 so that the stretched cylindrical member 52 can then be telescoped over the mold member 51 with the sleeve 50 of fabric material disposed therebetween. Once the outwardly stretched mold member 52 has been disposed in place over the mold member 51 as illustrated in FIG. 16, the outer mold member 52 is released so that the outer mold member 52 begins to contract toward the inner mold member 51 whereby the cooperating teeth 53 and 54 of the mold members 51 and 52 begin to form the sleeve 50 therebetween in the manner illustrated in FIG. 17.

Figure 17:
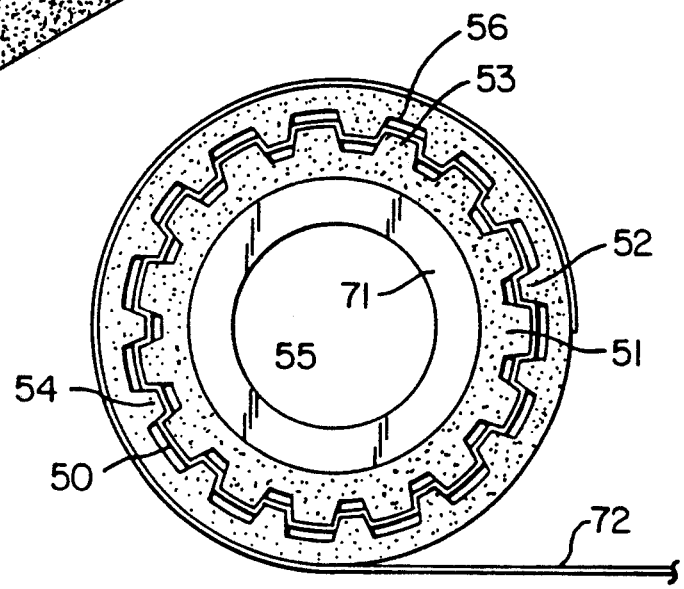
FIG. 17 is an enlarged end view of the structure of FIG. 16 and illustrates how a sheet of shrinkable material is wrapped around the structure and how the mold members have partially formed the sleeve of fabric means therebetween.
Figure 18:
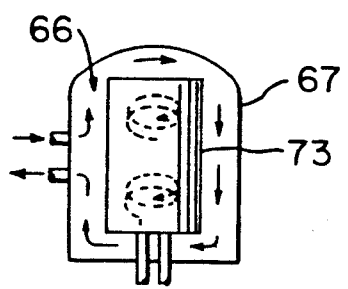
FIG. 18 is a view similar to FIG. 3 and illustrates how the structure of FIG. 17 is subjected to heat and pressure by the apparatus of FIG. 3.

Thereafter, the structure of FIG. 17 is wrapped with a nylon shrink film 72 in a manner similar to film 64 with the resulting structure 73 then being placed in the chamber 66 of the apparatus 67 to subject the same to heat and pressure whereby the shrink film 72 causes the outer mold member 52 to have the teeth 54 thereof readily indexed into the grooves 55 of the inner mold member 51 while the teeth 53 of the inner mold member 51 readily index into the grooves 56 of the outer mold member 52 to completely form the teeth 38 and grooves 40 of the liner means 37 in the manner illustrated in FIG. 19, the heat of the apparatus 67 setting the teeth 38 and grooves 40 of the sleeve 39 in the accurate condition thereof as illustrated in FIG. 19 so that when the outer mold member 52 is removed from the structure in the manner illustrated in FIG. 20, the preformed sleeve 39 can be removed from the inner mold member 51 in the manner illustrated in FIG. 21 by untelescoping the same therefrom.

Alternately, the inner backing member 71 can be removed from the inner mold member 51 as illustrated in FIG. 22 and then the inner mold member 51 can be inwardly folded in the manner illustrated in FIG. 23 to be removed from the outer mold member 52 leaving the sleeve 39 in its preformed condition as illustrated in FIG. 23. Thereafter, the preformed sleeve 39 can be inwardly folded in the manner illustrated in FIG. 24 to be readily removed from the outer mold member 52, such inward folding of an inner member from an outer member being a procedure well known in the art as fully set forth in FIG. 11 of the aforementioned U.S. patent to Thomas et al, U.S. Pat. No. 3,839,116.

In any event, the subsequently removed sleeve 39 of fabric means has the teeth 38 and projections 40 thereof formed in an accurate manner so that the same can readily line the mold member 43 in a telescoping manner as illustrated in FIGS. 25 and 26 as previously described to form the belt sleeve 42 as previously described.

While the preformed liner means 39 of this invention has been formed of a nylon stretch fabric having an isocyanate treatment so as to render the same heat settable, it is to be understood that this invention is not limited to this combination as other fabric means and treatments can be utilized. For example, other types of fabric means can comprise polyester, nomex, or hybrids of materials, such as a Kevlar warp with a nylon fill, a polyester warp with a nylon fill, or a Kevlar warp with a polyester fill. The treatments could comprise a phenolic treatment or a recorcinol formaldehyde latex treatment, etc., the main feature being that the fabric material should be a stretch fabric material and that the treatment permits the same to be heat set at a certain elevated temperature after the same has been formed into its preformed condition by the mold members 51 and 52 of this invention as previously set forth.

Therefore, it can be seen that this invention not only provides a new toothed belt construction and a new preformed fabric means therefor, but also this invention provides new methods of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a preformed fabric means for lining the toothed surface means of a toothed belt construction, said method comprising the step of forming a fabric means so as to have serially disposed tooth-shaped projections substantially throughout the length thereof that accurately correspond to the teeth of said belt construction so as to line the toothed surface means thereof, the improvement comprising the steps of forming said preformed fabric means to comprise an endless tubular sleeve, the step of forming said fabric means to have said tooth-shaped projections comprising the step of disposing said fabric means between a pair of cooperating and telescoped cylindrical mold members respectively having teeth that index with each other to form said tooth-shaped projections of said fabric means, forming one of said mold members by deforming a first sleeve of polymeric material under heat and pressure against a cylindrical mold device that has teeth thereon that are substantially the same size and configuration as the teeth of said belt construction whereby said first sleeve has teeth formed therein, removing said first sleeve from said mold device, inverting said first sleeve, deforming a second sleeve of polymeric material under heat and pressure against said inverted first sleeve to form teeth in said second sleeve that are in indexed relation with said teeth of said first sleeve, inverting said sleeves while said second sleeve is against said first sleeve, and then separating said inverted sleeves whereby said separated sleeves now comprise said cylindrical mold members to be utilized to form said fabric means therebetween.

2. A method of making a preformed fabric means as set forth in claim 1 wherein the step of forming said preformed fabric means to comprise an endless tubular sleeve comprises the step of providing said fabric means as an endless tubular sleeve before the step of forming said tooth shaped projections.

3. A method of making a preformed fabric means as set forth in claim 1 and including the step of subjecting said telescoped cylindrical mold members with said fabric means therebetween to heat and pressure so as to heat set said tooth-shaped projections of said fabric means.

* * * * *